US008555943B2

(12) United States Patent
Flynn

(10) Patent No.: US 8,555,943 B2
(45) Date of Patent: Oct. 15, 2013

(54) METHOD FOR PRINTING INDIVIDUAL LABELS

(76) Inventor: Timothy J. Flynn, Key Largo, FL (US)

( * ) Notice: Subject to any disclaimer, the term of this patent is extended or adjusted under 35 U.S.C. 154(b) by 208 days.

(21) Appl. No.: 12/836,742

(22) Filed: Jul. 15, 2010

(65) Prior Publication Data

US 2012/0012249 A1 Jan. 19, 2012

(51) Int. Cl.
*B32B 38/14* (2006.01)

(52) U.S. Cl.
USPC ........... 156/388; 156/253; 156/277; 101/485; 101/483

(58) Field of Classification Search
USPC ............ 156/277, 253, 388, 387, 250; 283/81; 101/483, 485; 347/104; 358/1.18
See application file for complete search history.

(56) References Cited

U.S. PATENT DOCUMENTS 4,272,327 A * 6/1981 Logan ........................... 283/116
4,716,052 A 12/1987 Waugh et al.
4,793,545 A 12/1988 Raymond
4,910,058 A * 3/1990 Jameson ...................... 428/42.3
5,011,559 A * 4/1991 Felix ............................ 156/257
5,039,132 A * 8/1991 Anderson ....................... 283/67
5,324,153 A * 6/1994 Chess ............................... 412/9
5,332,265 A * 7/1994 Groess et al. ................... 283/56
5,407,718 A 4/1995 Popat et al.
5,489,168 A 2/1996 Sheldon et al.
5,621,864 A * 4/1997 Benade et al. ............... 358/1.18
5,630,627 A * 5/1997 Stewart ........................... 283/81
5,655,711 A 8/1997 Hull et al.
5,740,961 A 4/1998 Bruning
5,756,175 A * 5/1998 Washburn .................... 428/42.3
5,792,297 A 8/1998 Hunter et al.
5,899,379 A 5/1999 Bruyn et al.
6,068,195 A 5/2000 Gaudet
6,071,585 A * 6/2000 Roth ............................ 428/41.8
6,129,288 A 10/2000 Petersen et al.
6,170,879 B1 * 1/2001 Rawlings ........................ 283/81
6,213,407 B1 4/2001 Ellis et al.
6,293,473 B1 9/2001 Ortwein et al.
6,726,116 B2 4/2004 Hofstetter, Sr.
6,764,021 B1 7/2004 Birt et al.
6,776,866 B2 * 8/2004 Flynn et al. ................... 156/247
6,986,306 B2 * 1/2006 McKillip ...................... 101/226
2002/0068141 A1 * 6/2002 Pieper et al. ................. 428/42.3
2004/0150218 A1 * 8/2004 Wasko .......................... 283/106
2004/0182507 A1 9/2004 Flynn et al.
2009/0295143 A1 * 12/2009 Flynn et al. ..................... 283/81

FOREIGN PATENT DOCUMENTS

KR 10-0186681 B1 5/1999
KR 10-2004-0003728 A 1/2004

* cited by examiner

*Primary Examiner* — Katarzyna Wyrozebski Lee
*Assistant Examiner* — Vishal I Patel
(74) *Attorney, Agent, or Firm* — Pauley Petersen & Erickson

(57) ABSTRACT

A method and software for a consumer end user to print one or more, but generally less than all, labels of a label assembly without the need to run the label assembly though a printer multiple times. A boundary corresponding to the label is printed on a separate paper sheet to allow the label to be positioned for printing. The paper sheet with the label adhered within the boundary is run through a printer to print on the label. The printed label is removed from the paper sheet to applying to the intended object to be labeled. Software can be implemented on a data processor for printing the boundary and/or coordinating the label printing with the printed boundary.

21 Claims, 4 Drawing Sheets

METHOD FOR PRINTING INDIVIDUAL LABELS

FIELD OF THE INVENTION

This invention relates generally to a method and software for printing labels and, more particularly, to printing individual labels from a sheet of self-adhesive labels that are easily removed from a backing and surrounding matrix.

BACKGROUND OF THE INVENTION

Self-adhesive labels of printable label assembly sheets for printing, such as through a computer printer, of individual address labels are well known. After printing on the labels while still part of the label assembly, each label is removed from the assembly sheet and applied to the desired substrate, such as an envelope for mailing. Removal of the labels by hand is generally performed by bending back the label sheet in a vicinity of a corner of the first label to be removed, which causes separation of the label and the liner.

End users often need to print only one or a few of the labels from the label assembly. Multiple printings of one or a few labels subjects the label assembly to the heat, pressure/strain, and/or residue/dust within the printer, which can have a negative affect on the label assembly, particularly over multiple runs through a printer. In addition, many labels for color and/or ink jet printer require more expensive label stock and/or coatings, and multiple printing runs may diminish or damage the more expensive materials. There remains a need for products that facilitate printing smaller numbers of labels.

SUMMARY OF THE INVENTION

The invention provides a method and software for printing less than the entire amount of labels on a label assembly without routing the label assembly itself through a printer.

The can be attained, at least in part, through a method for printing a label for an object, including adhering a label to a material sheet (i.e., a sheet that is not a label sheet) using a printed boundary, and printing on the label adhered on the material sheet by routing the material sheet with the label adhered thereon through a printer. The material sheet can be any suitable material, such as paper or plastic, and can simply be a sheet of paper in the possession of the end user printing the label. The boundary can printed on the material sheet that receives the label for label printing, or the material sheet can be nonopaque (i.e., see-through) and the boundary can be printed on a second material sheet that is aligned under the material sheet for adhering the label on the nonopaque material sheet.

The method is designed to be performed by an end user who purchased a label assembly but wants to print one or a few of the total number of labels on the label assembly. The label is removed from the label assembly and adhered to the separate material sheet for printing, and then removed from material sheet for adherence to the object. Computer software can be used to form and print the boundary for aligning the label in a position on the material sheet, and the computer software can then print the intended subject matter on the label when the material sheet with the adhered label is routed through the printer.

The invention further includes a method for printing a label for an object, including: providing a label for the object, routing a material sheet through a printer and printing a boundary on the material sheet that correspondingly outlines an outer peripheral shape of the label, adhering the label on the material sheet or on a second material sheet that is nonopaque using the boundary printed on the material sheet, routing the material sheet with the label adhered thereon through the printer to print on the label, and removing the printed label from the material sheet for adhering to the object. After the printed label is removed it can be adhered onto the object to be labeled. The steps of the method can be performed by an end user, and not a label manufacturer, with the creation and printing of the boundary and/or the printing of the labels being performed using a personal computer.

The invention further includes software on a computer-readable medium. The computer-readable storage medium is encoded with instructions for allowing a user to print a label for an object. The encoded instructions can include a first program code for storing label dimensions or boundary dimensions for a plurality of labels, the labels and label dimensions or boundary dimensions identified by a label code, and a second program code for sending print instructions to a printer associated with the data processor for printing a boundary selected by the user. The computer-readable code can also include instructions for printing on the label positioned within the printed boundary.

The software can create a new user interface or operate within existing word processing programs. The user interface can display one or more label representations for use in creating the subject matter to be printed on the label. One or more than one label representation, including label representations of different sizes and shapes, can be shown in the user interface for printing on the same material sheet. The software prints the necessary boundaries corresponding to the label representations and then, when the material sheet with the label is routed, prints on the labels themselves. The software desirably prints the label subject matter within the printed boundary, and may require an input or identification of material sheet size, either automatically or manually by the user.

Other objects and advantages will be apparent to those skilled in the art from the following detailed description taken in conjunction with the appended claims and drawings.

DETAILED DESCRIPTION OF THE EXEMPLARY EMBODIMENTS

Figure 1:
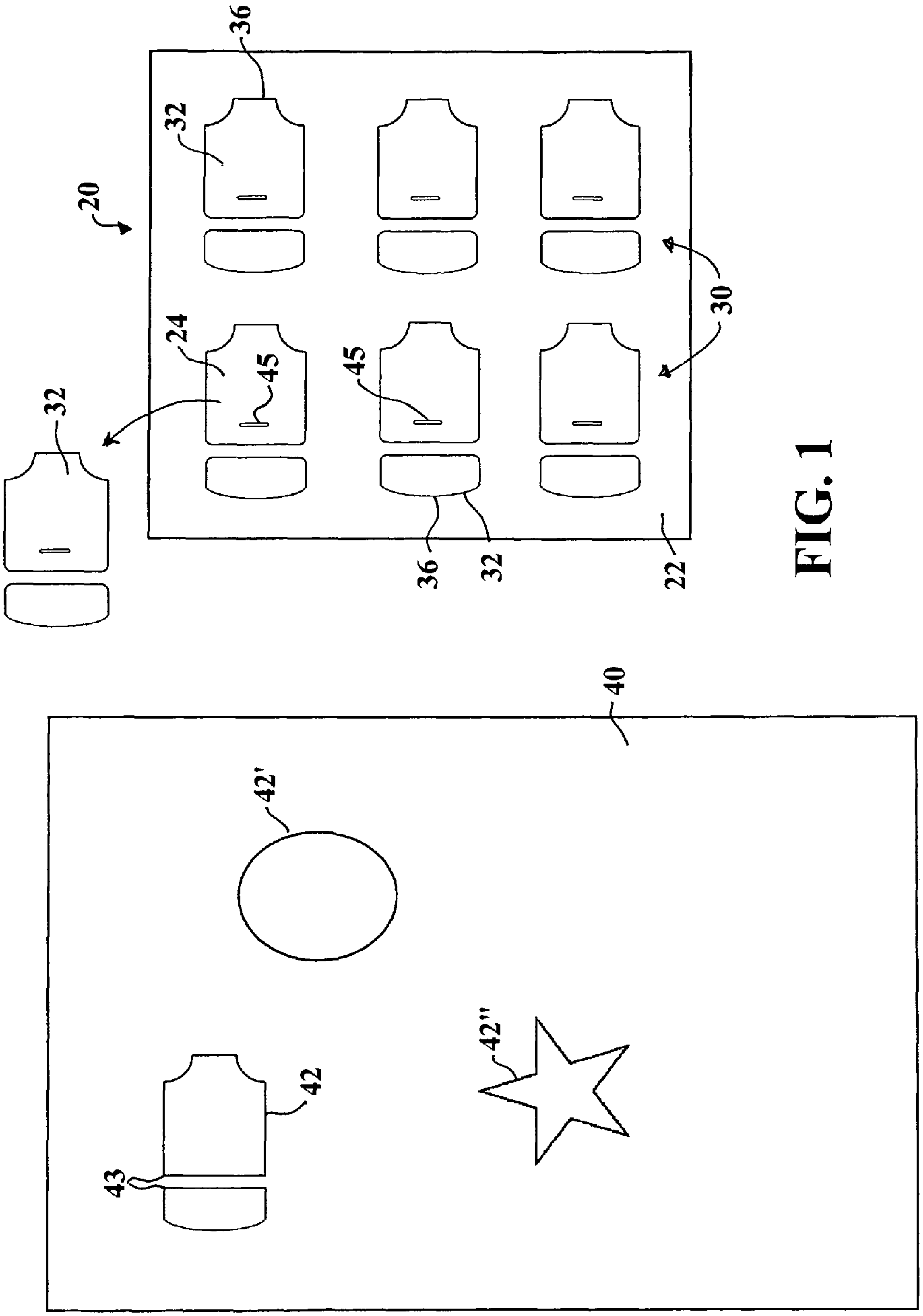
FIG. 1 illustrates a label assembly and a material sheet being used according to one embodiment of this invention.

FIG. 1 includes a label assembly 20 (not necessarily shown to scale), for use in the method according to one embodiment of this invention. Label assembly 20 is desirably formed of a face sheet 22 and a back sheet 24 shown where the one label 32 has been removed. The back sheet 24 is desirably about the same size as the face sheet 22, but may be slightly larger or smaller than the face sheet 22. The surface of the face sheet 22 that is disposed toward the back sheet 24 includes a layer of an adhesive material. The adhesive layer can include any adhesive material known and available to those skilled in the art for forming pressure sensitive, or self-adhesive labels. The back sheet 24 is desirably formed of a material to which the adhesive coating adheres significantly less than to the face sheet 22, such as is known for forming pressure sensitive, or self-adhesive, labels. The adhesive coating covered by the back sheet 24 is applied to the face sheet 22 in any suitable manner known to those skilled in the art.

The sheet assembly 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. The face sheet 22 is preferably, but not necessarily, constructed of any suitable paper, paper composite, non-metal and/or metal material that can be used as a label. Other suitable materials for constructing the sheet 22 include fabric, plastic, and metal foils.

The face sheet 22 desirably has a printable surface on a side opposite the adhesive coating. The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

The face sheet 22 and the printable surface can be any of a variety of face materials used to make pressure sensitive, or self-adhesive, labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

Figure 3:
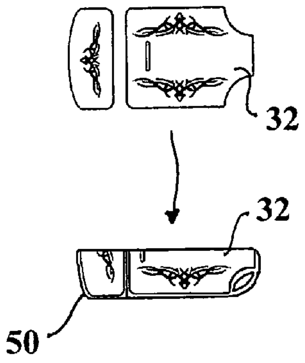
FIG. 3 shows the printed label of FIG. 2 in its final position on a flash memory drive.

The face sheet 22 includes, without limitation, two label columns 30, each including a plurality of labels 32. The labels 32 shown are sized and shaped for a particular flash memory drive (i.e., thumb drive) shown in FIG. 3, but can be of any of various shapes such as square, rectangular, circular, or any needed shape. Each flash drive label 32 includes two label parts, one for the drive body and a smaller label portion for the drive cover. Each label also includes a removable shape 45, cut within the label 32 and corresponding to a functional or decorative feature of the flash drive 50, that can be removed manually or remain on the back sheet 24 when the label 32 is removed (as shown in FIG. 1). Also, the configuration of the label columns 30 can vary depending on need and the shape of the labels. For example, the label columns can run vertically as shown or horizontally, and the number of labels per label column depends on the size and shape of the labels as well as the face sheet 22.

Each of the labels 32 is defined by a tearable line of separation 36 extending around the label shape. A matrix 34 borders and surrounds each of the label columns 30. Each label 32 abuts a portion of the matrix 34 and is separated from the matrix 34 and an adjacent label 32 by the corresponding tearable line of separation 36. As used throughout this specification and in the claims, the phrase "tearable line," the phrase "line of separation," and/or the phrase "tearable line of separation" is intended to relate to a line of weakening of the structure of face sheet 22. Each tearable line or line of weakening, according to this invention, comprises at least one of a die cut line, a kiss cut line (which is a die cut line that does not extend completely through a layer or sheet), a laser die cut line, a score cut line, a perforation line, a microperforation line, a chemically etched line, a liquid etched line and/or a gas etched line. Tearable lines of this invention may comprise any other suitable separation line or line of weakening known to those skilled in the art of label assemblies.

FIG. 1 also includes a material sheet 40 having a boundary 42 printed thereon. The material sheet 40 can be formed of any suitable material for printing thereon, such as the materials discussed above for the face sheet 22 and without any labels, adhesive, etc. Desirably the material sheet of this invention is formed of a simple sheet of paper or a plastic film sheet. The boundary 42 can be pre-printed by the manufacturer of the label assembly 20 and packaged with the label assembly 20. The boundary 42 can also be printed by the end user on a material sheet either provided with the label assembly or on any suitable paper sheet in the user's possession. As used herein, "end user" refers to the consumer of the labels, namely the person or entity that prints and/or applies the label(s) of the label assembly to an object. Also, whereas FIG. 1 shows a single boundary for one label 32, more than one boundary can be printed on the sheet 40 for labels 32, or other labels shapes, such as represented by boundaries 42' and 42". Where the boundary is printed by the user, such as using the software described below, the user or the data processor can identify the number, shapes, and/or sizes of boundaries to be printed depending on the number and sizes of labels to be printed. A pre-printed material sheet can include multiple printed boundaries to accommodate multiple individual labels at one time, and can also include boundaries for different labels shapes and sizes, such as using different colored lines to represent boundaries for different label sizes.

Figure 2:
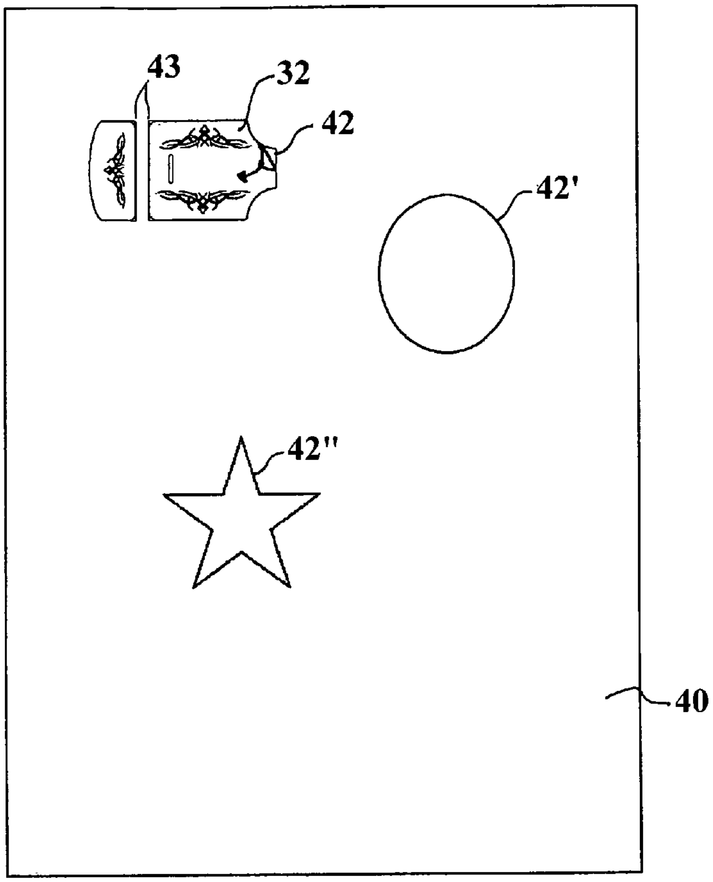
FIG. 2 shows a printed label on and being removed from the material sheet of FIG. 1

The boundary 42 desirably has a size and shape corresponding to the labels 32. As shown in FIG. 1, a label 32 is removed from the label assembly 20 and placed within the printed boundary 42 as shown in FIG. 2. The printed boundary of this invention does not require the exact shape or size as the label it receives, such as shown in FIGS. 1 and 2, where the label 32 has rounded corners 33 and the boundary 42 does not, instead having squared corners 43. The boundary of this invention also does not need to extend around the entire periphery of the corresponding label, and can, for example, simply outline one or more corners and/or one or more edges of the corresponding label. In one embodiment of this invention, the boundary outlines at least a portion of the label. As used herein, "outline" refers to a marking including a portion, for example an outer edge, a portion of the marking thickness, or an inner edge, that bounds or runs even with an outer perimeter of the label. The boundary 42 size, shape, and configuration can vary, but desirably allows the end user to properly place the label 32 at the correct position and alignment on sheet 40 for printing.

The end user places the label 32 within the boundary 42. The label 32 removably adheres to the sheet 40 for printing on the label 32. The material sheet 40 with the label 32 adhered thereon can then be routed through a printer for printing on the label 32 while the label 32 is adhered to the sheet 40. The boundary 42 allows the end user to print on one or more, but not all, of the labels 32 from the label assembly 20 without routing the label assembly 20 itself through the printer. The printed boundary 42 provides a positioning tool to align the label 32 in the proper position for printing thereon. Computer software is desirably used to automatically print the boundary 42 and then to print the label subject matter within the same boundary 42 when the label 32 on the material sheet 40 is routed through the printer the second time.

As shown in FIG. 2, after the label 32 has been printed, the label 32 is removed from the material sheet 40. The adhesive material on the label 32 is an adhesive, such as known to those skilled in the art, that can removably adhere to the material sheet and the subsequently adhere to another substrate. The removed label 32 can then be adhered to the intended object to be labeled, such as the flash drive 50 shown in FIG. 3. By using the method discussed above and illustrated in FIGS. 1-3, the end user has selectively printed one label from a label assembly without having to run the label assembly through a printer.

Figure 4:
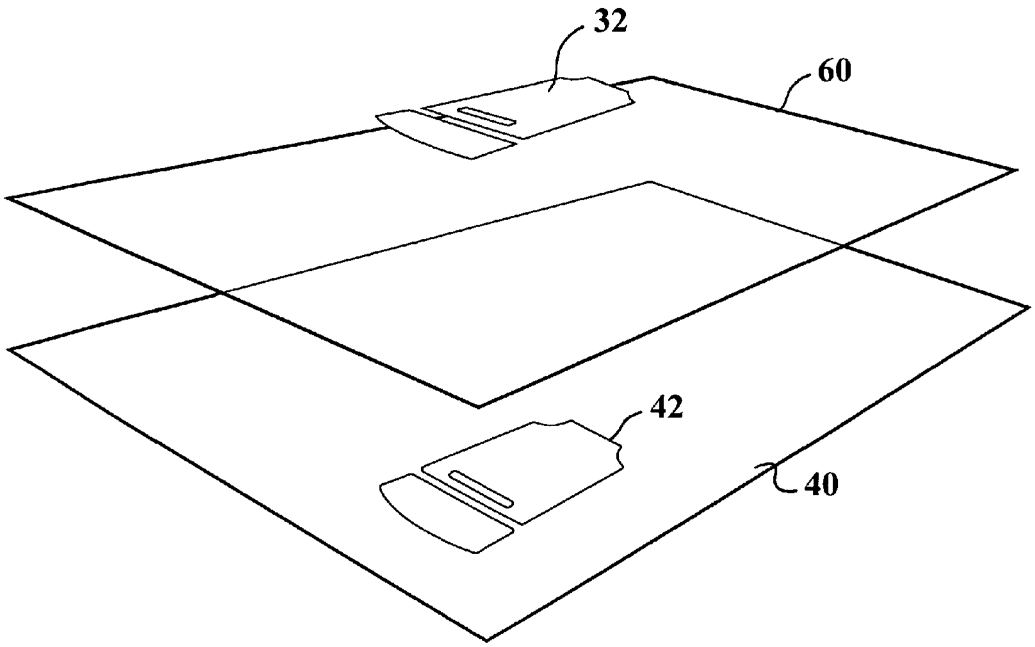
FIG. 4 illustrates adhering a label to a material sheet for printing according to another embodiment of this invention.
Figure 5:
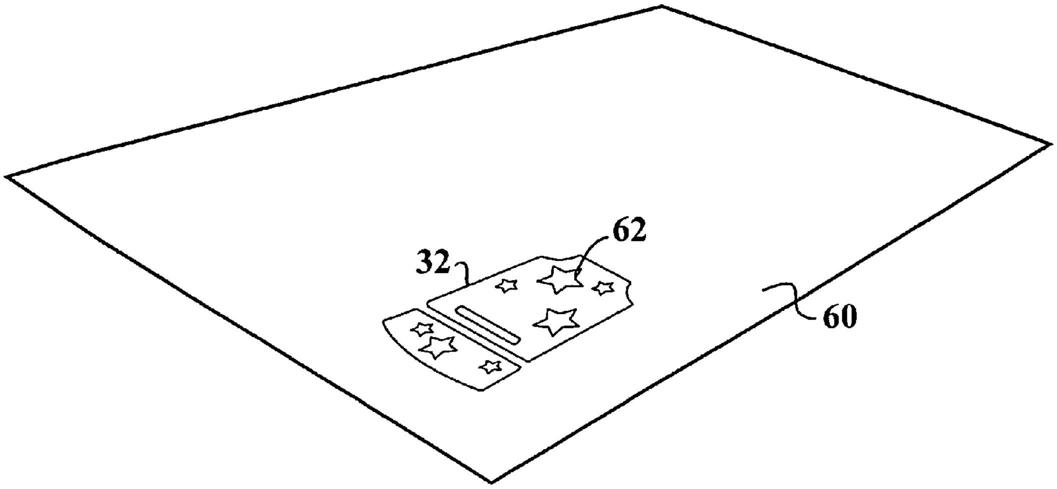
FIGS. 5-6 illustrate the label of FIG. 4 after printing.
Figure 6:
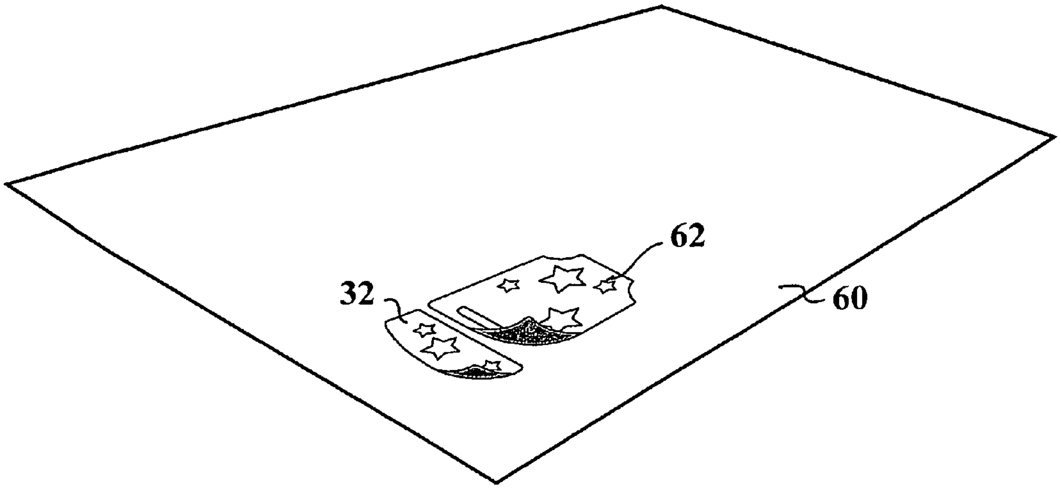

FIGS. 4-6 illustrate the use of the printed boundary to print on a single label, according to another embodiment of this invention. FIG. 4 includes a material sheet 40 having a boundary 42 printed thereon. The material sheet 40 can be formed of any suitable material for printing thereon, such as described above, and the boundary can be embodied and/or printed as discussed herein. In one embodiment of this invention, the material sheet 40 shown in FIG. 4 is an ordinary sheet of printer paper, such as 8.5 inch by 11 inch paper.

In the embodiment shown in FIG. 4, a second material sheet 60 is placed over the material sheet 40, and between the label 32 and the material sheet 40. The second material sheet 60 desirably has a size and shape corresponding to the material sheet 40 and is nonopaque, so that when overlaid on the material sheet 40, the boundary 42 is visible through the second material sheet 60. As used herein, "nonopaque" refers to a property of being clear or otherwise see-through, so that the printed boundary 42 is at least detectable through the second material sheet, and includes both transparent and suitable translucent materials. Various materials are useful for the nonopaque material sheets of this invention. In one embodiment of this invention, the nonopaque second material sheet 60 is a plastic sheet or film. Other suitable materials include translucent paper and/or fabric sheet. The second material sheet 60 can also be treated with a release agent to facilitate removal of the adhesive label 32. Suitable release agents include, without limitation, silicone, PTFE, lacquer or other materials known for use in creating label assembly back sheets.

The second material sheet 60 is placed on and over the printed material sheet 40. The label 32 is then aligned with the boundary 42, which is visible through the second material sheet 60, and adhered to the second material sheet 60 while aligned with and within the boundary 42. In this embodiment of the invention, the second material sheet 60 can be a material, such as included within the label assembly packaging, to which the adhesive of label 32 releases from particularly well. The second material sheet 60 is desirably reusable, particularly because the boundary 42 is not printed thereon.

The second material sheet 60 including the adhered label 32 is routed through the printer to print the designated subject matter, shown as stars 62 in FIG. 5. As the computer software is desirably used to automatically print the boundary 42 and then to print the label subject matter within the same boundary 42, the printer still deposits the printing on the label 32 adhered to the second material sheet 60 because the label 32 was adhered, when the two material sheets were aligned at the edges, in a position corresponding to the boundary 42 position, despite the boundary 42 not being printed on the second material sheet 60. As shown in FIG. 6, the printed label 32 desirably releases easily from the second material sheet 60 to be labeled on the intended object as discussed above.

The invention further includes a software product for use by the end user in creating the printed boundary of this invention. The software product can be a standalone product or a module for use with or within other word processing and/or label making software. With the software module, the user can then use a data processor to select or create a corresponding boundary to be printed for the label on the material sheet. The boundary can be created from scratch using the measurements of the corresponding label, but desirably is selected from a database stored on a readable storage medium, such as a computer or network hard drive, in readable association with the data processor. The boundary can be identified in the database by size or any suitable identifier. In one embodiment, the boundary is automatically selected from the database of boundaries upon the identification of the label to be printed. As labels are typically identified by a number, the corresponding boundary can also be identified or associated with that label number.

The software includes code with instructions for creating a user interface within the word processing software or as a stand alone interface. The software generates the label boundary selected or otherwise identified by the user. The boundaries can be created individually or can be shown as matching the label assembly. The ability to create singular boundaries as needed, provides the ability to print multiple label types (see FIG. 1) on one material sheet at one time. The user interface desirably allows the user to create and move the boundary or label representations within the user interface to position the one or more representations as desired.

In one embodiment of this invention, an end user can use a label template, such as through currently available word processing programs, to create the labels to be printed. The data processor determines that the end user has created and is going to print a number of labels that is less than all the labels on the label assembly corresponding to the template. The software running on the data processor can automatically prompt the end user to insert a material sheet for printing the necessary one or more boundaries, and then when one or more labels are applied within the one or more boundaries and ready for printing, the actual label content can be printed by the data processor and printer. The end user can also be given the opportunity to decline the use of the printed boundaries and simply continue to print on the label assembly.

The software of this invention can be encoded on a computer-readable storage medium. The medium is encoded with instructions for allowing a user to print a label for an object. In one embodiment of this invention, the encoded instructions include a first program code for storing, creating, or downloading label dimensions or boundary dimensions for a plurality of labels. The labels and label dimensions or boundary dimensions are desirably identified by a label name or code, such as is established by the label assembly manufacturer. The encoded instructions also include a second program code for sending the print instructions for the boundary to a printer associated with the data processor for printing a boundary needed or selected by the user. The encoded instructions can include code for any of the boundary creating steps described above, such as a third program code for automatically creating the boundary from stored label dimensions. The encoded instructions can also include code for prompting or instruction the end user to enter the material sheet for printing the boundaries, such as upon the creation of the desired label content through a label printing template on a computer.

Thus the invention provides a method for printing less than all labels of a label assembly without running the label assembly itself through the printer. The invention also provides software for printing a boundary and/or a label positioned within the boundary, thereby allowing a consumer end user to easily align the label on the separate material sheet in the proper position for printing.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for printing a label for an object, comprising:

overlaying a nonopaque material sheet on a second material sheet including a boundary printed on the second material sheet;

adhering the label on the material sheet within the boundary printed on the second material sheet; and printing on the label adhered on the material sheet by routing the material sheet with the label adhered thereon through a printer.

2. The method according to claim 1, further comprising selecting with a data processor a corresponding boundary to be printed for the label on the material sheet from a database stored on a data processor readable storage medium in readable association with the data processor.

3. The method according to claim 2, wherein the boundary has a size and shape that outlines an outer peripheral shape of the label.

4. The method according to claim 3, further comprising removing the label from the material sheet after printing.

5. The method according to claim 3, wherein the boundary outlines the label.

6. The method according to claim 4, further comprising adhering the label to the object after printing.

7. The method according to claim 2, wherein the boundary is created automatically by the data processor upon identifying the label.

8. The method according to claim 1, wherein the steps of printing the printed boundary, adhering, and printing on the label are performed by an end user labeling the object.

9. The method according to claim 1, further comprising removing the label from the material sheet after printing.

10. The method according to claim 1, wherein the material sheet is a plastic film.

11. The method according to claim 1, further comprising printing the boundary on the second material sheet by routing the second material sheet through the printer.

12. The method according to claim 1, wherein the boundary outlines the label.

13. The method according to claim 1, further comprising removing the label from a label assembly to adhere the label within the boundary, the label assembly comprising a plurality of labels.

14. The method according to claim 13, wherein the label assembly comprises a face sheet, an adhesive material on one side of the face sheet, and a back sheet disposed over the adhesive material, the face sheet including the plurality of labels cut therein.

15. A method for printing a label for an object, comprising:

providing a label for the object;

routing a material sheet through a printer and printing a boundary on the material sheet that correspondingly outlines an outer peripheral shape of the label;

adhering the label on a second material sheet that is nonopaque and placed over the material sheet, in alignment with the boundary printed on the material sheet;

routing the second material sheet with the label adhered thereon through the printer to print on the label; and removing the printed label from the second material sheet for adhering to the object.

16. The method according to claim 15, wherein the material sheet is a paper sheet or a plastic film.

17. The method according to claim 15, further comprising adhering the label to the object after printing.

18. The method according to claim 15, further comprising selecting with a data processor a corresponding boundary to be printed for the label on the material sheet from a database stored on a data processor readable storage medium in readable association with the data processor.

19. The method according to claim 18, wherein the boundary is created automatically by the data processor upon identifying the label.

20. The method according to claim 15, further comprising removing the label from a label assembly to adhere the label within the boundary, the label assembly comprising a plurality of labels.

21. The method according to claim 20, wherein the label assembly comprises a face sheet, an adhesive material on one side of the face sheet, and a back sheet disposed over the adhesive material, the face sheet including the plurality of labels cut therein.

* * * * *